Dec. 1, 1931.  W. J. KIEFER  1,834,062
ARMORED CABLE COUPLING
Filed May 10, 1928
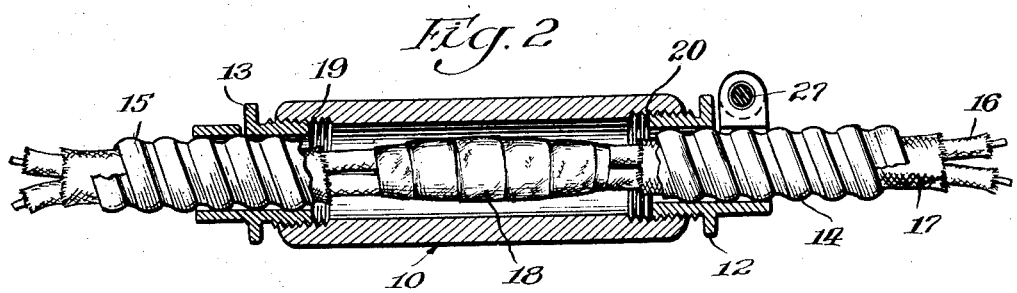
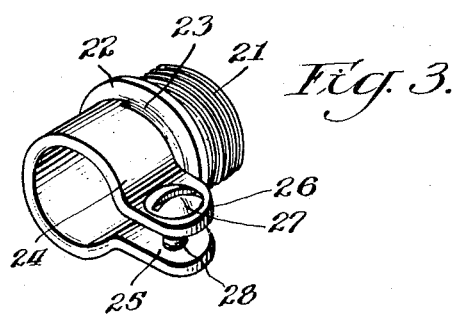
Inventor
Wilbert J. Kiefer
By Williams, Bradbury, McCaleb & Hinkle Atty's Patented Dec. 1, 1931

1,834,062

UNITED STATES PATENT OFFICE

WILBERT J. KIEFER, OF CHICAGO, ILLINOIS

ARMORED CABLE COUPLING

Application filed May 10, 1928. Serial No. 276,775.

This invention relates to electrical wiring systems and armored conductors of that type in which one or more separately insulated conductors are enclosed in a flexible metallic tube. More specifically, the armored tubing is formed of a spirally wound metallic strip, which strip is wound about the conductors during the process of manufacture so as to permanently encase the same. Where sections of such armored conductors are joined to each other, it is necessary to splice the individual strands or conductors and to insulate the same, which necessarily considerably enlarges the diameter at that point.

One object of my present invention is to construct and design a coupling which will mechanically and electrically join the armored cable sections, enclosing the insulated joint and thoroughly protect the same.

Another object is to provide a coupling which is composed of separable sections, whereby it is rendered capable of being readily applied to or detached from the adjacent ends of armored cable.

A further object is to provide a coupling which will connect short sections of armored cable together, thereby eliminating the cost of purchasing one continuous length of armored cable.

A further object is to provide a coupling of unusual simplicity, well suited for connecting adjacent ends of armored cable.

A still further object is to provide a coupling which is cheap to manufacture and assemble.

In the present state of the art, insulated electrical conductors have been enclosed in an armor formed of a spirally wound metallic strip. Where sections of such armored conductor are to be joined, the armor is stripped from the conductors for a certain distance and the individual wires are spliced and then taped for insulation in the usual way. It is necessary, however, to provide a rigid armored coupling to cover and protect the joint, which I have accomplished and which will be hereinafter set forth.

It is understood that my coupling combination is intended to connect mechanical devices as well as for conductors of electricity.

The invention consists in the features of construction and combination of parts hereinafter fully described and claimed, reference being had to the accompanying drawings, in which, Fig. 1 is an elevational view of the coupling in its entirety, showing the same applied to the adjacent ends of armored cable;

Fig. 2 is a longitudinal sectional view of the coupling taken on the line 2—2 of Fig. 1; and Fig. 3 is a perspective view of the clamping member detached.

Similar reference numbers refer to similar parts throughout the several views.

Referring to the drawings and particularly to Figs. 1 and 2, it will be seen that the preferred embodiment of my invention consists of a connecting sleeve 11 threaded internally at each end and two clamping members 12 and 13. The adjacent armored cable sections consist of two insulated conductors 16, braid insulation 17 which insulates the conductors from the flexible metallic tubing, and the flexible metallic tube itself as indicated by the numerals 14 and 15. The clamping members 12 and 13 have the usual externally threaded sleeve 21, corresponding ears 25 and 26, clamp screw 27, collar or flange 22, and slit 23, as fully illustrated in Fig. 3. These clamping members are usually made of cast malleable iron. The connecting sleeve 11 which is threaded internally at each end is of sufficient length to enclose a wrapped joint. This connecting sleeve may be an ordinary piece of rigid iron conduit, such as is commonly used for electric conduit wiring, or it may be any other suitable piece of iron pipe.

In the assemblage of parts, the clamping member 13 is placed on one end of the cable section 15, as shown in Fig. 2, before the cable sections 15 and 14 are joined together. The clamp screw 27 is then inserted into threaded hole 28, the said screw being turned, which contracts the ears 25 and 26, thereby firmly engaging the end of cable section 15. The armored cable sections 15 and 14 are then mechanically and electrically connected, the wrapped joint being indicated by the numeral 18.

The connecting sleeve 11 is next slipped over cable section 14 and wrapped joint 18, the said sleeve engaging the complementary threads on the clamping member 13 at the junction indicated by the numeral 19. The clamping member 12 is then slipped over cable section 14, the external threads 21 of clamping member 12 engaging with the internal threads of connecting sleeve 11, the junction being indicated by the number 20. The clamp screw 27 of the clamping member 12 is then inserted into threaded hole 28, the said screw being turned, which contracts the ears 25 and 26 of the clamping member 12, thereby firmly engaging the end of the cable section 14.

While I have herein described in detail a specific embodiment of my invention, it will be understood that various changes and modifications may be made without departing from the spirit of my invention within the scope of the appended claims.

I claim:

1. In a coupling for flexible armored cable or the like the combination of a sleeve formed of stock metal pipe and adapted to cover the joint in a flexible armored conductor, said sleeve being threaded internally at each end, a pair of clamping members having complementary threads to fit said sleeve, said clamping members having a peripheral flange to abut against the ends of said sleeve, said clamping members also being provided with radially projecting ears, a clamp screw, said ears being threaded to receive said clamp screw, said clamp screw being adapted to compress said ears to firmly clamp an armored cable, and said coupling having a circumference slightly larger than the said armored cable to adapt the same to be drawn through the hollow portions of walls or the like.

2. In a coupling for armored cable, the combination of two sections of an electrical conductor, a pair of flexible metallic tubes encasing said electrical conductors, said conductors extending beyond the ends of said tubes, said conductors electrically joined and covered with insulation, a metallic covering for said joint comprising a tubular member formed of stock metal, said tubular member being of sufficient length to enclose both ends of said flexible tubes, said tubular member being internally threaded at each end, a pair of clamping members provided at each end having complementary threads to fit said tubular member, a peripheral flange on said clamping members adapted to abut against the ends of said tubular member, radially projecting ears on said clamping members, a clamp screw, said ears threaded to receive said screw for providing a rigid connection between each piece of flexible metallic tubing and said tubular member.

3. In a coupling for flexible armored cable or the like, the combination of a sleeve adapted to cover a joint in a flexible armored conductor, said sleeve including internal threads at each end, a pair of clamping members including complementary threads for threaded engagement in the ends of the sleeve, said clamping members comprising means for clampingly securing therein the ends of flexible armored cable, and flanges on said members for engaging the ends of the sleeve, the circumference of said coupling being only slightly larger than the armored cable such that it may be drawn through hollow walls or the like.

In witness whereof, I hereunto subscribe my name this 9th day of May, 1928.

WILBERT J. KIEFER.